(12) United States Patent
Yvetot

(10) Patent No.: US 11,828,194 B2
(45) Date of Patent: Nov. 28, 2023

(54) NOZZLE BLADE FOR A TURBINE ENGINE, NOZZLE, TURBINE ENGINE AND METHOD FOR MANUFACTURING SAME

(71) Applicant: SAFRAN AIRCRAFT ENGINES, Paris (FR)

(72) Inventor: Jonathan Yvetot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/801,439

(22) PCT Filed: Feb. 24, 2021

(86) PCT No.: PCT/FR2021/050319
§ 371 (c)(1),
(2) Date: Aug. 22, 2022

(87) PCT Pub. No.: WO2021/170952
PCT Pub. Date: Sep. 2, 2021

(65) Prior Publication Data
US 2023/0086163 A1    Mar. 23, 2023

(30) Foreign Application Priority Data

Feb. 28, 2020    (FR) .................................... 2002005

(51) Int. Cl.
*F01D 5/18*    (2006.01)
*F01D 9/06*    (2006.01)
(Continued)

(52) U.S. Cl.
CPC .............. *F01D 5/189* (2013.01); *B23P 15/04* (2013.01); *F01D 9/065* (2013.01); *F01D 17/162* (2013.01);
(Continued)

(58) Field of Classification Search
CPC .......... F01D 5/188; F01D 5/189; F01D 5/186; F01D 9/065; F05D 2230/60;
(Continued)

(56) References Cited

U.S. PATENT DOCUMENTS 4,252,501 A * 2/1981 Peill ........................ F01D 9/065
                                                        415/115
4,798,515 A    1/1989 Hsia et al.
(Continued)

FOREIGN PATENT DOCUMENTS

EP    1 626 162 A1    2/2006

OTHER PUBLICATIONS

International Search Report as issued in International Patent Application No. PCT/FR2021/050319, dated Apr. 21, 2021.

*Primary Examiner* — Christopher Verdier
(74) *Attorney, Agent, or Firm* — Pillsbury Winthrop Shaw Pittman LLP

(57) ABSTRACT

A nozzle blade for a turbine engine includes a blade body in which at least one through-cavity is provided extending between an inner end of the blade and an outer end of the blade and housing, respectively, a first and a second liner, the first liner extending along a trailing edge of the blade, the second liner extending along a leading edge of the blade, wherein each of the first and second liners includes an intertwining system suitable for linking the first liner to the second liner, independently of the blade body.

10 Claims, 5 Drawing Sheets

(51) Int. Cl.
     *F01D 17/16*     (2006.01)
     *B23P 15/04*     (2006.01)

(52) U.S. Cl.
     CPC ...... *B23P 2700/06* (2013.01); *F05D 2230/51* (2013.01); *F05D 2230/60* (2013.01); *F05D 2260/201* (2013.01); *F05D 2260/36* (2013.01); *Y10T 29/49343* (2015.01)

(58) Field of Classification Search
     CPC ......... F05D 2260/201; F05D 2260/202; B23P 15/02; B23P 15/04; B23P 15/008; B23P 2700/01; B23P 2700/06; B23P 2700/13; Y10T 29/49343
     See application file for complete search history.

(56) References Cited

U.S. PATENT DOCUMENTS

| | | | | |
|---|---|---|---|---|
| 5,145,315 | A * | 9/1992 | North | F01D 5/189 |
| | | | | 415/115 |
| 2008/0317585 | A1* | 12/2008 | Lee | F01D 5/189 |
| | | | | 60/39.83 |
| 2009/0067987 | A1* | 3/2009 | Pellet | F01D 5/189 |
| | | | | 29/889.1 |
| 2013/0051980 | A1* | 2/2013 | Grohens | F01D 17/085 |
| | | | | 415/115 |
| 2018/0328187 | A1 | 11/2018 | Oke | |

* cited by examiner

Fig. 4
PRIOR ART
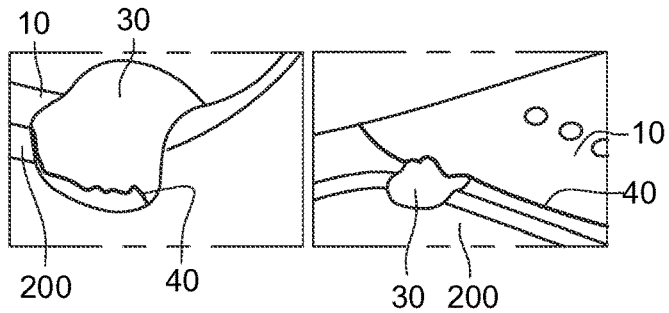
Fig. 5
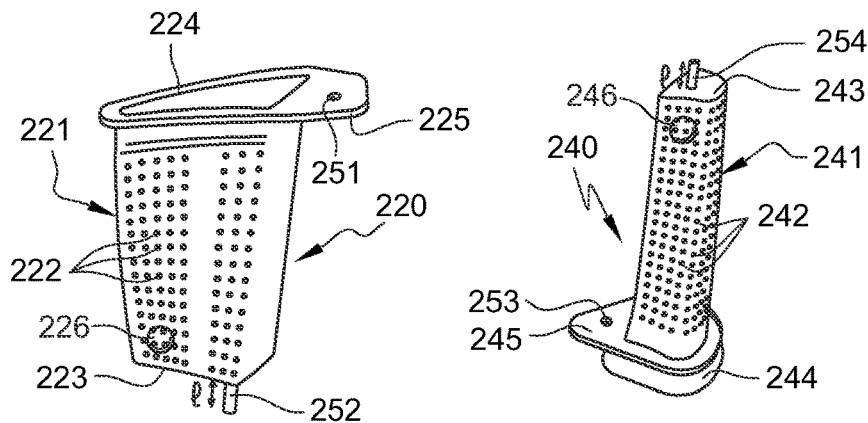
Fig. 6A      Fig. 6C
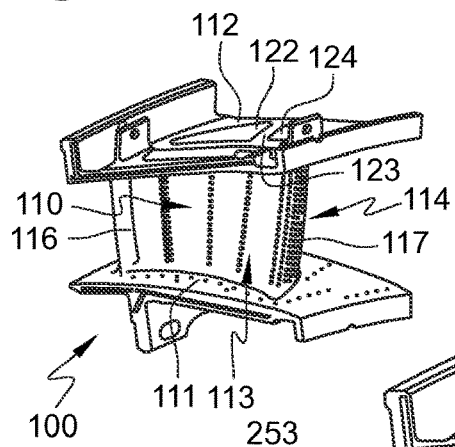
Fig. 6D      Fig. 6B

Fig. 7A
Fig. 7C
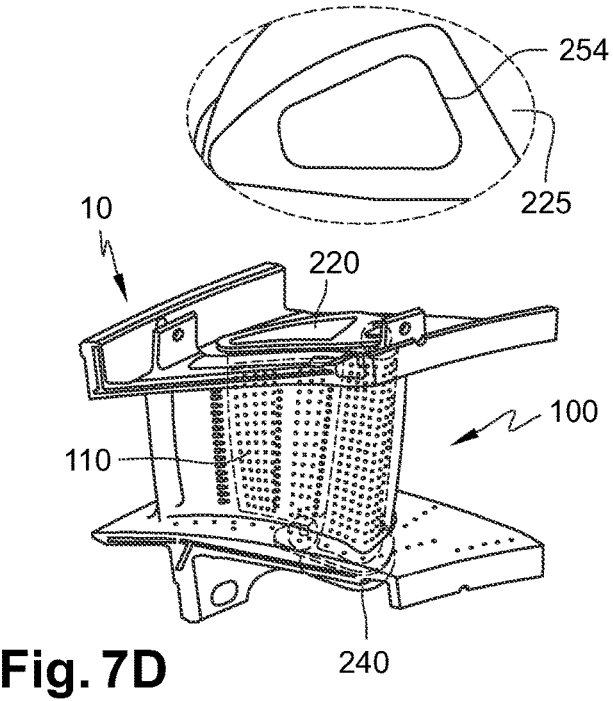
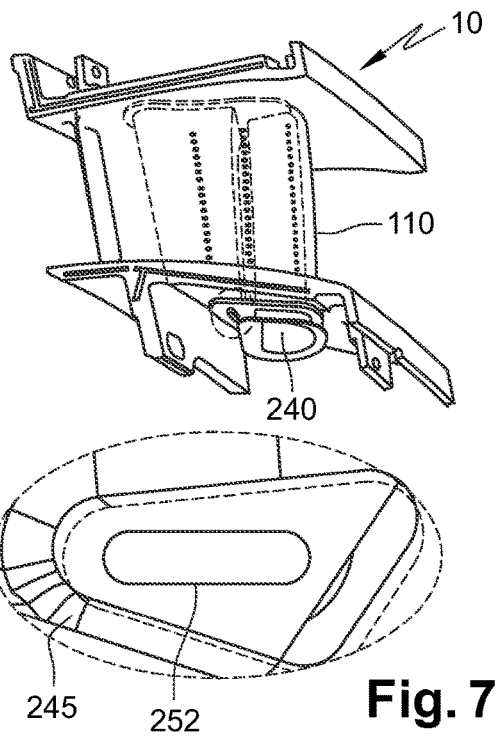
Fig. 7D
Fig. 7B
Fig. 8
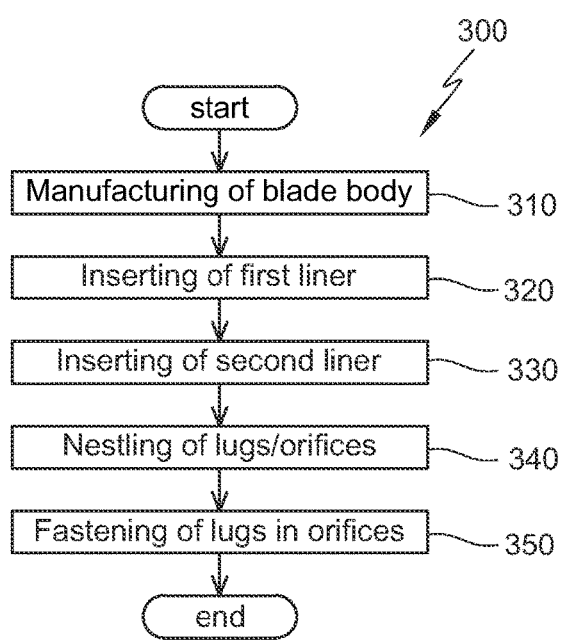

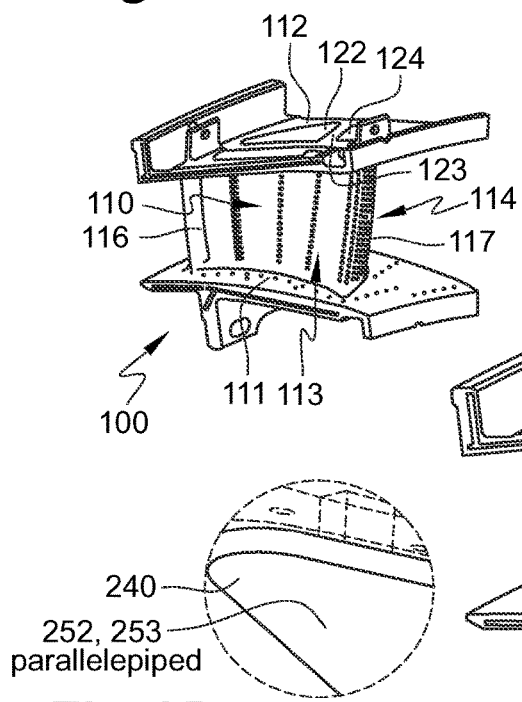
Fig. 9A
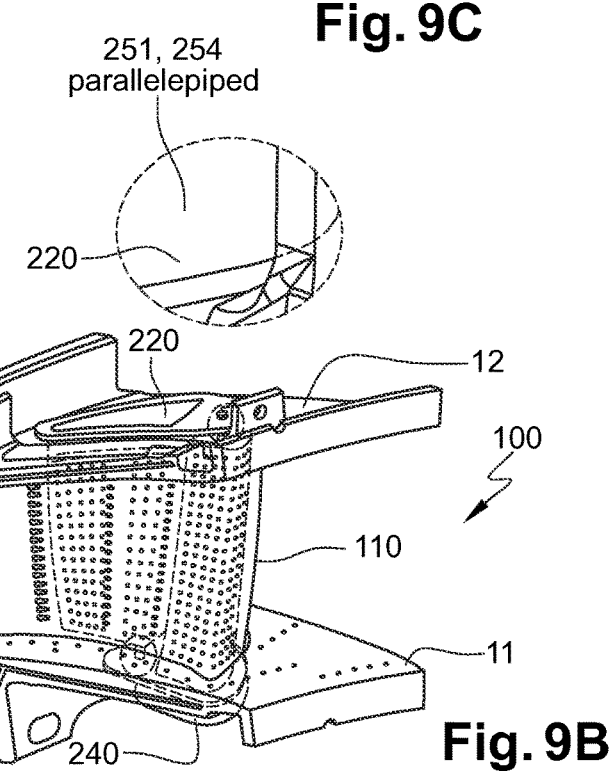
Fig. 9C
Fig. 9B
Fig. 9D
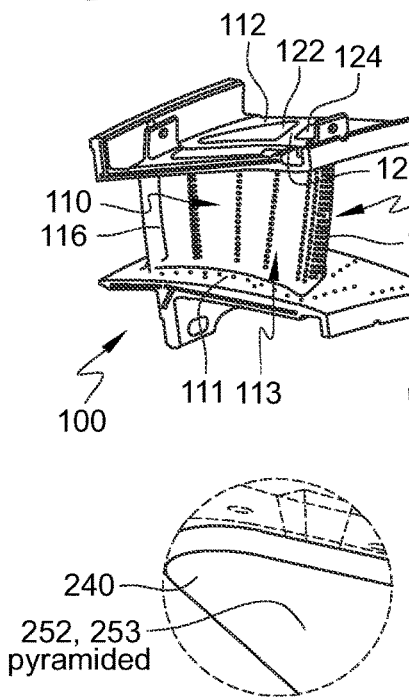
Fig. 10A
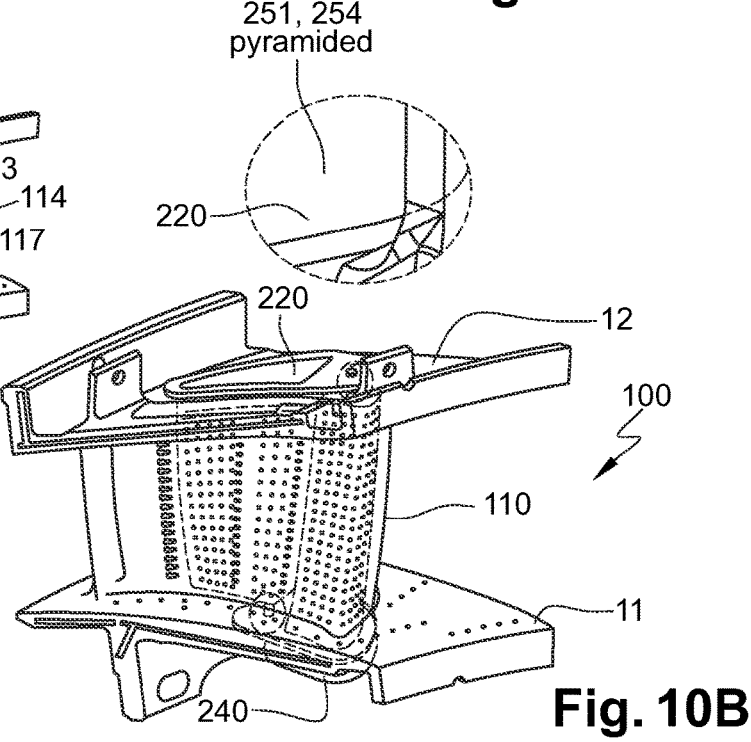
Fig. 10C
Fig. 10B
Fig. 10D

Fig. 11A
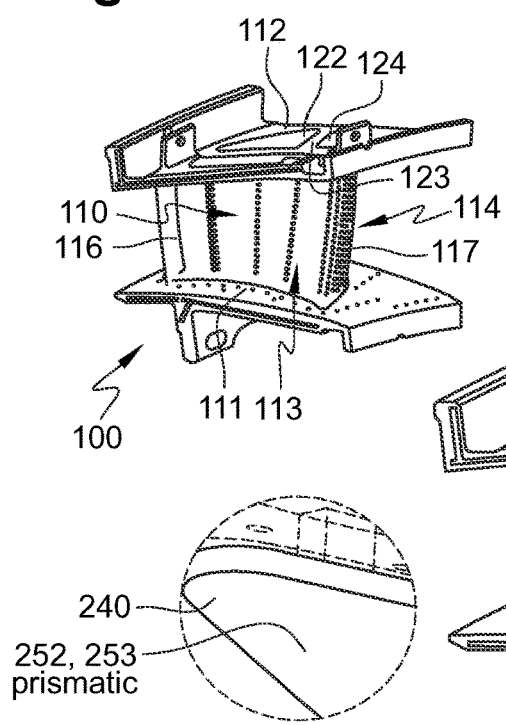
Fig. 11C
Fig. 11B
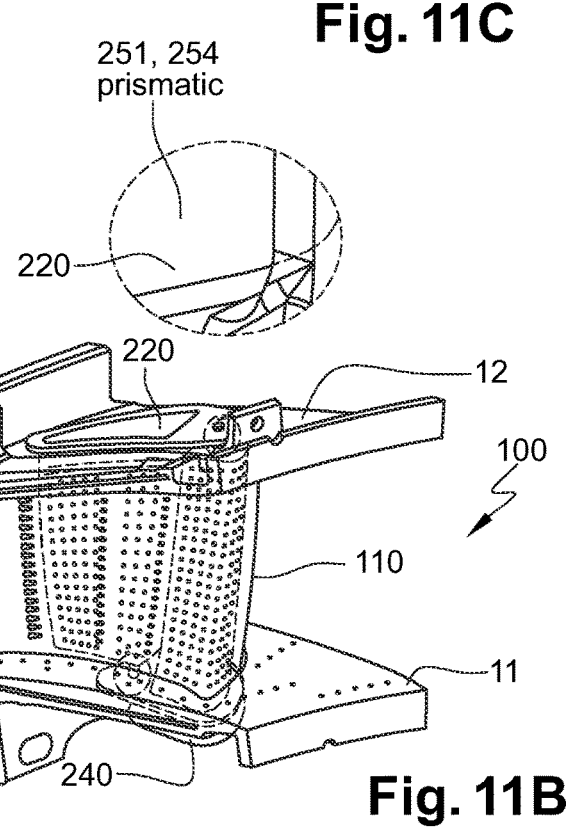
Fig. 11D
Fig. 12A
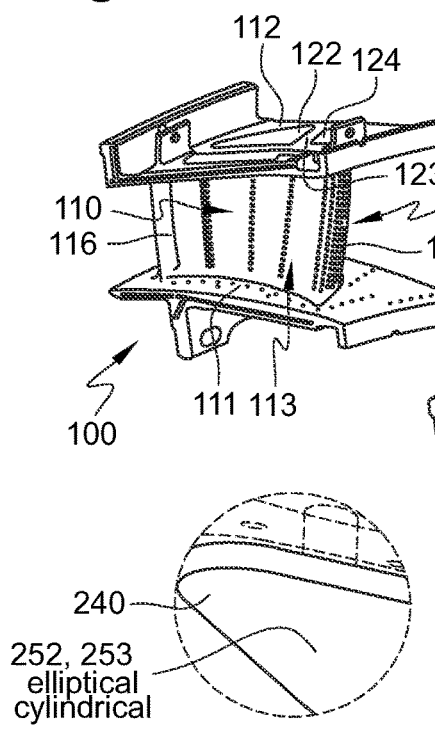
Fig. 12C
Fig. 12B
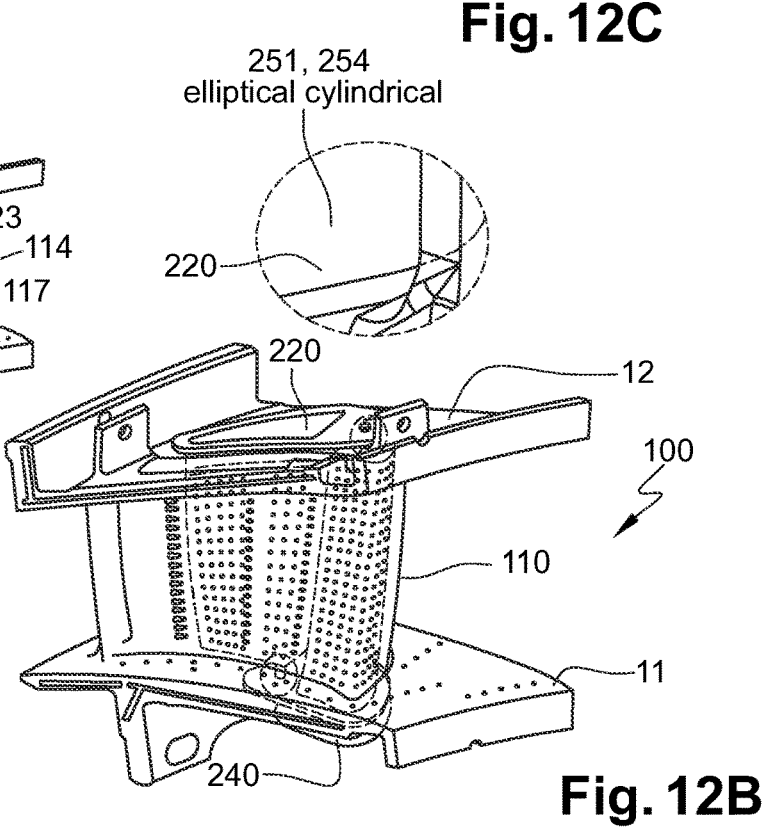
Fig. 12D

NOZZLE BLADE FOR A TURBINE ENGINE, NOZZLE, TURBINE ENGINE AND METHOD FOR MANUFACTURING SAME

CROSS-REFERENCE TO RELATED APPLICATIONS

This application is the U.S. National Stage of PCT/FR2021/050319, filed Feb. 24, 2021, which in turn claims priority to French patent application number 2002005 filed Feb. 28, 2020. The content of these applications are incorporated herein by reference in their entireties.

TECHNICAL FIELD OF THE INVENTION

The present invention relates to a blade of a high or low pressure nozzle for a turbine engine wherein the liners are nested one in the other. The invention also relates to a method for manufacturing such a blade. The invention also relates to a high or low pressure nozzle provided with such blades and a turbine engine provided with this nozzle.

The invention has applications in the field of aeronautics and, in particular, in the field of high or low pressure nozzles of aircraft engines.

TECHNOLOGICAL BACKGROUND OF THE INVENTION

In an aircraft turbine engine, such as for example a turbojet or a turboprop, the high pressure nozzle and the low pressure nozzle each comprise a set of hollow blades, fixed and arranged annularly in the gas flow duct between the outlet of the combustion chamber and the inlet of the turbine. An example of a portion of a high pressure nozzle 10 is shown in FIG. 1. This high pressure nozzle 10 comprises a plurality of blades 100 extending radially between two coaxial annular platforms, namely an internal platform 11 and an external platform 12, that delimit the circulation duct 13 of the gases ejected by the combustion chamber. Each one of the blades 100 comprises a blade body 110 comprising an inner radial end 111 and an outer radial end 112. The blade body 110 comprises, between its inner 111 and outer 112 ends, an intrados wall 113 and an extrados wall 114 each equipped with cooling orifices 115 suitable for allowing air to pass.

Due to their positioning in the circulation duct of the gases 13, all of the blades 100 are subjected to the very high temperatures of the gases. The blades 100 must therefore be constantly cooled. For this, in addition to the cooling orifices 115, the blade body 110 of each blade 100 generally comprises one or more through-cavities 120 extending radially between the inner end 112 and the outer end 111. A sealing liner 200, more simply called a liner, is embedded in each one of the through-cavities 120 of each blade 100 in such a way as to define an annular peripheral interstice between the internal surface of the blade body and the external surface of the liner. An example of a blade 100 with two through-cavities 122, 124 each housing a liner 200 is shown mounted in FIG. 2 and as exploded in FIG. 3. The two through-cavities 122, 124 of the blade 100 are coaxial and extend radially one against the other. The first through-cavity 122, positioned on the trailing edge 116 of the blade, houses a first liner 220; the second through-cavity 124, positioned on the leading edge 117 of the blade, houses a second liner 240.

Each liner 220, 240 comprises a radial wall 221, 241 provided with a plurality of holes 222, 242 distributed over the entire radial wall, between the internal 11 and external 12 annular platforms. Each liner 220, 240 comprises a closed face 223, 243 and an open face 224, 244. The closed face 223 of the first liner 220 emerging at the inner end 111 of the blade 100 and the closed face 243 of the second liner 240 emerging at the outer end 112 of the blade 100. The open face 224 of the first liner 220 emerging at the outer end 112 of the blade 100 and the open face 244 of the second liner 240 emerging at the inner end 111 of the blade 100. Thus, the open face 224, 244 of each one of the liners 220, 240 receives relatively cool air, taken upstream is from the combustion chamber, at the output of a stage of the compressor. This cool air penetrates inside the liners 220, 240 to cool via impact, from the inside, the intrados 113 and extrados 114 walls of the blade.

The open face 224, 244 of the liners 220, 240 generally comprises a collar, respectively 225 and 245, making it possible to maintain a radial air gap between the liner and the blade. This collar 225, 245 also makes it possible to fasten the liner in the nozzle. Indeed, each liner is fastened on the nozzle 10, generally, by welding—for example by means of three welding sports distributed on the collar contour—or by brazing—for example by means of a braze extending over the entire contour of the collar. With this type of fastening (welding or brazing) of the liners in the nozzle, each liner is embedded within the nozzle and mechanically linked to said nozzle. However, the connection, or fastening, zones of the liners on the nozzle are zones that can be high stressed. Indeed, under the effect of the changes in temperature within each turbine, the nozzle and the liners tend to expand. However, the nozzle and the liners are manufactured in different metals, for example AM1 or Rene 125 alloys for the nozzle and Hastelloy X or HA 188 for the liners, which generates substantial stresses at the connection zones between liners and nozzle, Examples of cracks are shown in FIG. 4, at the connection zones 30 between a liner 200 and a nozzle 10. The stresses generated in the connection zones 30 by the expansions can be at the origin of cracks 40 and even ruptures in these connection zones, with for effect to weaken the nozzle. As a weakened nozzle is considered to be deteriorated, the technician in charge of maintenance must remove and replace the weakened nozzle during maintenance operations, which of course generates a cost in terms of parts, manpower and immobilisation time of the aircraft.

SUMMARY OF THE INVENTION

To respond to the problems mentioned hereinabove of stress at the connection zones between the liners and the high or low pressure nozzle, the applicant proposes a nozzle blade wherein the liners are linked to one another in such a way as to be mechanically independent of said nozzle.

According to a first aspect, the invention relates to a nozzle blade for a turbine engine comprising a blade body wherein at least one through-cavity is provided extending between an inner end of the blade and an outer end of said blade and housing, respectively, a first and a second liner, the first liner extending along a trailing edge of the blade, the second liner extending along a leading edge of said blade. This blade is characterised by the fact that each one of the first and second liners comprises an intertwining system suitable for linking the first liner to the second liner, independently of the blade body.

This nozzle blade, low or high pressure, has the advantage of comprising liners that are mechanically independent of the blade body and of which the connection zone is, consequently, not sensitive to any differences in expansion of the materials used to manufacture the blade body and the liners.

Advantageously, the blade body can comprise a first and a second through cavity that extend coaxially between the inner end and the outer end of the blade, the first liner being housed inside the first cavity of the blade and the second liner being housed inside the second cavity of said blade.

Advantageously, when the first liner comprises a closed face emerging at the inner end of the blade and an open face emerging at the outer end of said blade, and the second liner comprises a closed face emerging at the outer end of the blade and an open face emerging at the inner end of said blade, the intertwining system comprises at least one lug protruding on the closed face of each one of the liners and an orifice provided in the open face of each one of the liners, the lug of each closed face being able to be inserted into the orifice of the open face of the other liner.

In addition to the characteristics that have just been mentioned in the preceding paragraphs, the nozzle blade according to an aspect of the invention can have one or more additional characteristics among the following, taken individually or in any technically permissible combination:

- the open face of each one of the liners comprises a collar extending at least partially on the closed face of the other liner and in that the orifice of the open face is provided in the collar.
- the lug on the closed face of each liner is fastened by welding or brazing in the orifice of the open face of the other liner.
- the lug on the closed face of each liner and the orifice of the open face of the other liner comprise shapes and dimensions suitable for nesting into one another.
- the lug of the first liner and the orifice of the second liner have shapes and/or dimensions that are different from those of the lug of the second liner and of the orifice of the first liner.
- the lug is of cylindrical or elliptical cylindrical shape and the orifice is of a, respectively, circular or oval shape.
- the lug is of parallelepiped, pyramidal or prismatic shape and the orifice is of a complementary polygonal shape.

According to a second aspect, the invention relates to a high or low pressure nozzle for a turbine engine comprising a ring of fixed blades, mounted between an internal annular platform and an external annular platform, coaxial, characterised in that each blade is in accordance with the blade defined hereinabove.

According to a third aspect, the invention relates to a turbine engine comprising a high or low pressure nozzle such as defined hereinabove.

According to a fourth aspect, the invention relates to a method for manufacturing a blade of a nozzle for a turbine engine, comprising the following operations:

- manufacturing of a blade body provided with at least one through-cavity extending between an inner end and an outer end of said blade,
- inserting of a first liner inside the first cavity of the blade, via the outer end of said blade,
- inserting of a second liner inside the first cavity of the blade, via the inner end of said blade, with nesting of a lug of the second liner in an orifice of the first liner and of an orifice of the second liner on a lug of the first liner, in such a way as to link/attach/join the first and the second liners independently of the blade body, and
- fastening of each one of the lug/orifice assemblies by brazing or welding.

This method of manufacturing allows for a simple mounting of the liners in the blade body.

When the blade body comprises two coaxial cavities, the first liner is inserted inside the first cavity via the outer end of the blade and the second liner is inserted inside the second cavity via the inner end of said blade.

BRIEF DESCRIPTION OF THE FIGURES

Other advantages and characteristics of the invention shall appear when reading the description, illustrated by the figures wherein:

FIG. 4, already described, shows examples of cracks in the connection zones between a liner and high pressure nozzle according to the prior art;

FIG. 5 shows a diagrammatical view in perspective of an example of liners of a nozzle blade according to the invention;

FIGS. 6A-D show diagrammatical views in perspective of liners of FIG. 5 mounted in a nozzle blade according to the invention;

FIGS. 7A-D show diagrammatical views in perspective of liners mounted in a blade according to the invention with first (FIG. 7A and FIG. 7D) and second (FIG. 7B and FIG. 7C) alternatives of the lug/orifice assembly;

FIG. 8 shows an example of a functional diagram of the method for manufacturing a blade according to the invention, and FIGS. 9A-D, FIGS. 10A-D and FIGS. 11A-D and FIGS. 12A-D show diagrammatical views in perspective of liners mounted in a nozzle blade according to various embodiments of the invention.

DETAILED DESCRIPTION

An embodiment of a turbine nozzle blade wherein the liners are nested one in the other is described in detail hereinafter, in reference to the accompanying drawings. This example shows the characteristics and the advantages of the invention. It is however reminded that the invention is not limited to this example.

In the figures, identical elements are marked with identical references. With a concern for legibility of the figures, the scales of size between the elements shown are not respected.

Figure 1:
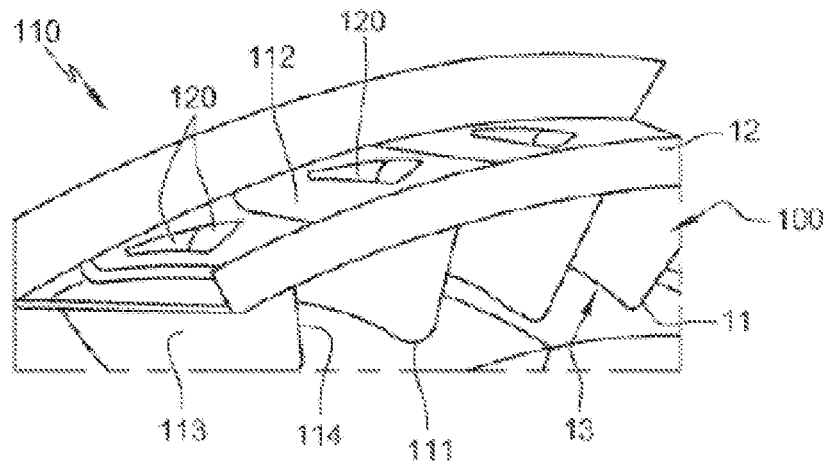
FIG. 1, already described, shows a partial diagrammatical view of a turbine high pressure nozzle according to the prior art.
Figure 2:
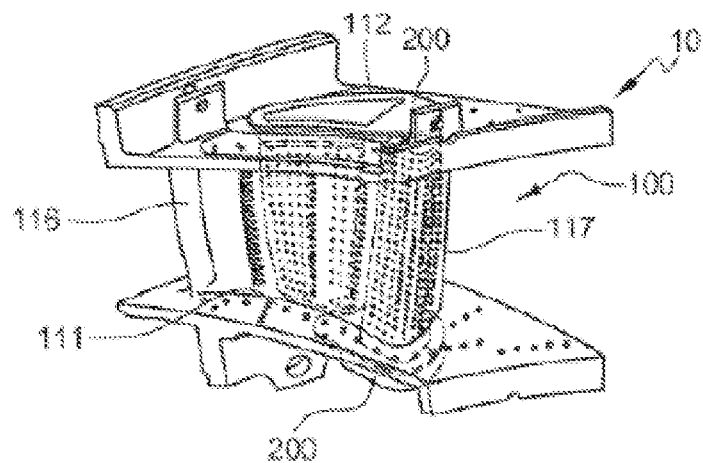
FIG. 2, already described, shows a diagrammatical view, mounted, of a blade with two liners of a high pressure nozzle according to the prior art.
Figure 3:
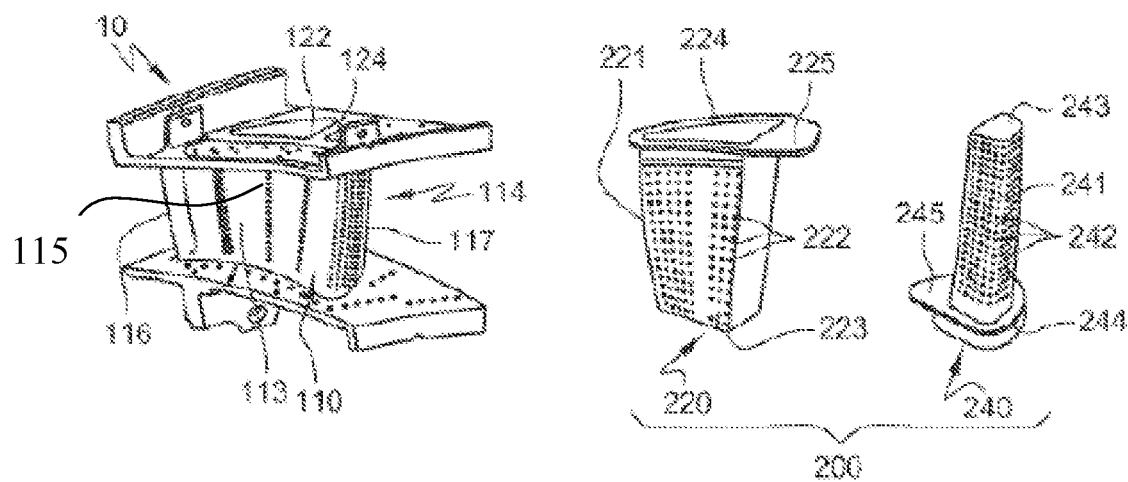
FIG. 3, already described, shows a diagrammatical view, exploded, of the blade and of the two liners of FIG. 2.

An example of a turbine nozzle blade is shown in FIGS. 5 and 6. In this example, the blade 100 is a blade of a high pressure nozzle, with the understanding that the characteristics of this blade are identical to those of a low pressure nozzle blade. This blade 100 is mounted between the internal 11 and external 12 platforms of the nozzle. It comprises a blade body 110, hollow, identical to the one shown in FIG. 3 and described hereinabove. This blade body 110 can comprise a single through-cavity 122 extending between the inner end 111 and the outer end 112 of the blade. Alternatively, it can comprise two through-cavities 122, 124 separated by a partition and which extend coaxially between the inner and outer ends of the blade. The following description will be given in the case where the blade body 110 comprises a first through-orifice 122 that extends radially along the trailing edge 116, between the inner end 111 and the outer end 112 of the blade, and a second through-orifice 124 that extends radially along the leading edge 117, between the inner end 111 and the outer end 112 of said blade, the two through-orifices 122, 124 being substantially coaxial and separated by an internal partition 123.

According to the invention, the blade 100 comprises a first liner 220 housed in the first though-orifice 122 and a second liner 240 housed in the second through-orifice 124, Each liner 220, 240 comprises a radial wall 221, 241 extending substantially annularly between a closed face 223, 243 and an open face 224, 244. The closed face 223 of the first liner 220 is positioned at the inner end 111 of the blade 100 and the closed face 243 of the second liner 240 is positioned at the outer end 112 of the blade 100. The open face 224 of the first liner 220 is positioned at the outer end 112 of the blade 100 and the open face 244 of the second liner 240 is positioned at the inner end 111 of the blade 100. The radial wall 221, 241 of each one of the liners comprises a plurality of holes 222, 242 distributed over the entire surface of said radial wall.

The dimensions of the liners 220, 240 are suited for the internal dimensions of the through-orifices, respectively 122, 124, in such a way as to delimit a peripheral interstice all around the wall of each one of the liners, this interstice being designed to allow for the circulation of cooling air. Each liner 220, 240 can comprise on the outer surface of its radial wall 221, 241 at least one protuberance or bulge, respectively 226 and 246, designed to provide a lateral air gap between the liner and the blade body 110. In other words, the protuberance 226, 246 is housed inside the interstice and provides the maintaining of the lateral air gap around the liner.

According to certain embodiments, each liner 220, 240 comprises a collar, respectively 225 and 245, around its open face 224, 244 making it possible to maintain a radial air gap between the liner and the end of the blade 100, This collar 225, 245 is a substantially planar extent that is deployed over the entire or a portion of the contour is of the open face 224, 244 of the liner and covering, when the liners are mounted in the blade body, a portion at least of the closed face of the other liner. This collar 224, 245 makes it possible to maintain a radial air gap between the liner and the end of the blade.

According to the invention, each liner comprises an intertwining system 251-254 suitable for mechanically linking the liners to one another, independently of the blade body and/or of the nozzle. In other words, the intertwining system 251-254 makes it possible to attach the first liner 220 on the second liner 240 and, reciprocally, the second liner on the first liner, without fastening any of the two liners on the blade or the nozzle.

In the example of FIGS. 5 and 6A-D, the intertwining system 251-254 of each liner comprises a lug 252, 254 and an orifice 251, 253. The lug 252, 254 is a protruding part or a prominence, for example metallic, arranged radially on the closed face 223, 243 of the liner. The orifice 251, 253 is a through-hole made provided on the open face 224, 244 of the liner. When the open face is provided with a collar 225, 245, the orifice 224, 244 is preferably carried out in the collar. In this example, and as shown in FIGS. 6C-D, the lug 254 of the second liner 240 is inserted into the orifice 251 of the first liner 220 and, reciprocally, the lug 252 of the first liner 220 is inserted into the orifice 253 of the second liner 240. In this way, the first liner 220 is attached to the second liner 240 on either side of the ends 111 and 112 of the blade.

In other terms, the two liners 220, 240, each housed in a cavity of the blade, are linked to one another at the inner end 111 of the blade and at the outer end 112 of the blade. The internal partition 123 of the blade body is inserted between the two liners 220, 240. Thus, each one of the liners 220, 240 is integral with the blade, without however being fastened directly on the blade or on the nozzle. The liners are therefore mechanically independent of the nozzle.

In certain embodiments, so as to fasten the assembly of the liners together, the lug on the closed face of each liner is fastened by welding or brazing in the orifice of the open face of the other liner in such a way that each lug 252, 254 is fastened with its respective orifice 253, 251. The fastening by welding or brazing can be carried out with or without the supply of additional metal.

Even when they are fastened by means of a weld or a braze, the connection zones of the two liners (i.e. the zones where the two liners are intertwined) are not is subjected to any mechanical stress resulting from a difference in expansion. Indeed, as the two liners are manufactured from the same material and are subjected to similar temperatures (since both are in the same ventilation flow), no mechanical stress resulting from the differences in expansion applies on the connection zones. The risk of cracking in these connection zones is therefore ruled out.

According to certain embodiments, the intertwining system of the liners at the outer end of the blade and the intertwining system of the liners at the inner end of the blade are identical. On the contrary, according to certain other embodiments, the two intertwining systems are different from one another.

When each one of the intertwining systems comprises a lug on the closed face of a liner and an orifice on the open face of the other liner, the shapes and the dimensions of the lugs and orifices are suitable for nesting one in the other. In particular, the orifice has a shape that is complementary with the outer shape of the lug, i.e. with its contour; likewise the orifice has dimensions that are slightly greater than those of the contour of the lug in such a way that the lug can pass through the orifice with minimum clearance.

For example, as shown in FIGS. 6A-D, the lug 252 and/or 254 can have a tubular shape, of circular section. It can, for example, have a diameter of about 2 mm and a length of about 5 mm. The orifice 251 and/or 253 then have an orifice with a circular section with a diameter slightly greater than 2 mm. In another example, the lug 252 and/or 254 can have an elliptical cylindrical shape, as shown in the example of FIG. 7B and FIG. 7C; the orifice 251 and/or 253 then has an oval shape. In the example FIG. 7A and FIG. 7D, the lug 252 and/or 254 can have a parallelepiped shape, with rounded edges; the orifice 251 and/or 253 then has a parallelogram shape with rounded angles. In yet other examples, the lug 252 and/or 254 can have different parallelepiped shapes, for example a parallelepiped with a square or rectangular section, or pyramidal or prismatic shapes, etc.; the orifice 251 and/or 253 is then of a complementary polygonal shape, for example square, rectangular or triangular. FIGS. 9A-D show an embodiment in which the lug 252 and/or 254 have a parallelepiped shape. FIGS. 10A-D show an embodiment in which the lug 252 and/or 254 have a pyramidal shape. FIGS. 11A-D show an embodiment in which the lug 252 and/or 254 have a prismatic shape. FIGS. 12A-D show an embodiment in which the lug 252 and/or 254 have an elliptical cylindrical shape and the orifice 251, 253 is oval.

The examples described hereinabove propose a lug/orifice assembly linking the two liners at the external face of the blade and another lug/orifice assembly linking the two liners at the internal face of the blade. Of course, in certain embodiments, several lug/orifice assemblies can be arranged on each closed face and each open face of the liners so as to increase the mechanical link between the two liners. These is different assemblies can be of identical or different shapes and/or dimensions.

The nozzle blade such as has just been described can be manufactured by a method 300, by implementing the operations 310 to 350 shown in FIG. 8. These operations are as follows:

Manufacturing, according to a conventional method, a blade body 110 wherein at least one first and one second through-cavities 122 are provided, 124 extending coaxially between the inner end 111 and the outer end 112 of the blade (step 310), Inserting, by the outer end 112 of the blade, of the first liner 220 inside the first cavity 122 of the blade body (step 320), Inserting, by the inner end 111 of the blade, of the second liner 240 inside the second cavity 124 of the blade body (step 330), Assembling two liners 220, 240 by inserting the lug 254 of the second liner into the orifice 251 of the first liner and the orifice 253 of the second liner on the lug 252 of the first liner (step 340), and Fixing by brazing or welding of the lug 254 and orifice 251 assembly and of the lug 252 and orifice 253 assembly (step 350).

Of course, operations similar to the operations 310 to 350 are carried out for each one of the blades 100 of the nozzle 10 in such a way that each one of said blades is provided with the same characteristics making it possible to link together the first and the second liners of each blade, independently of the blade body and therefore of the nozzle.

Although described through a certain number of examples, alternatives and embodiments, the nozzle blade for a turbine engine according to the invention comprises various alternatives, modifications and improvements that will appear obvious to those skilled in the art, with the understanding that these alternatives, modifications and improvements are part of the scope of the invention.

The invention claimed is:

1. A nozzle blade for a turbine engine comprising a blade body wherein at least one through-cavity is provided extending between an inner end of the nozzle blade and an outer end of said nozzle blade and housing a first and a second liner, the first liner extending along a trailing edge of the nozzle blade and comprising a closed face emerging at the inner end of the nozzle blade and an open face emerging at the outer end of said nozzle blade, the second liner extending along a leading edge of said nozzle blade and comprising a closed face emerging at the outer end of the nozzle blade and an open face emerging at the inner end of said nozzle blade, wherein each of the first and second liners comprises an intertwining system adapted to link the first liner to the second liner, independently of the blade body, said intertwining system comprising at least one lug protruding on the closed face of each one of the first and second liners and an orifice provided in the open face of each one of the first and second liners, the lug of the closed face of the first liner being able to be inserted into the orifice of the open face of the second liner and the lug of the closed face of the second liner being able to be inserted into the orifice of the open face of the first liner.

2. The nozzle blade according to claim 1, wherein the open face of the first liner comprises a collar extending at least partially on the closed face of the second liner and the open face of the second liner comprises a collar extending at least partially on the closed face of the first liner and wherein the orifice of the open face of the first liner is provided in the collar of the first liner and the orifice of the open face of the second liner is provided in the collar of the second liner.

3. The nozzle blade according to claim 1, wherein the lug on the closed face of the first liner is fastened by welding or brazing in the orifice of the open face of the second liner and wherein the lug on the closed face of the second liner is fastened by welding or brazing in the orifice of the open face of the first liner.

4. The nozzle blade according to claim 1, wherein the lug on the closed face of the first liner and the orifice of the open face of the second liner comprise shapes and dimensions suitable for nesting into one another and the lug on the closed face of the second liner and the orifice of the open face of the first liner comprise shapes and dimensions suitable for nesting into one another.

5. The nozzle blade according to claim 1, wherein the lug of the first liner and the orifice of the second liner have shapes and/or dimensions that are different from those of the lug of the second liner and of the orifice of the first liner.

6. The nozzle blade according to claim 4, wherein the lug of the first liner is of cylindrical or elliptical cylindrical shape and the orifice of the second liner is of a, respectively, circular or oval shape and wherein the lug of the second liner is of cylindrical or elliptical cylindrical shape and the orifice of the first liner is of a, respectively, circular or oval shape.

7. The nozzle blade according to claim 4, wherein the lug of the first liner is of parallelepiped, pyramidal or prismatic shape and the orifice of the second liner is of a complementary polygonal shape and wherein the lug of the second liner is of parallelepiped, pyramidal or prismatic shape and the orifice of the first liner is of a complementary polygonal shape.

8. A high or low pressure nozzle for a turbine engine comprising a ring of fixed blades, mounted between an internal annular platform and an external annular platform, the internal annular platform and the external annular platform being coaxial, wherein each blade is in accordance with claim 1.

9. A turbine engine, comprising the high or low pressure nozzle according to claim 8.

10. A method for manufacturing the nozzle blade for the turbine engine according to claim 1, comprising the following operations:

manufacturing the blade body provided with the at least one through-cavity extending between the inner end and the outer end of said blade, inserting the first liner inside the cavity of the blade, via the outer end of said blade, inserting the second liner inside the cavity of the blade, via the inner end of said blade, with nesting of the lug of the second liner in the orifice of the first liner and of the orifice of the second liner on the lug of the first liner so as to link the first and the second liners independently of the blade body, and fastening by brazing or welding the lug of the second liner with the orifice of the first liner and the lug of the first liner with the orifice of the second liner.

* * * * *